Patented Sept. 18, 1934

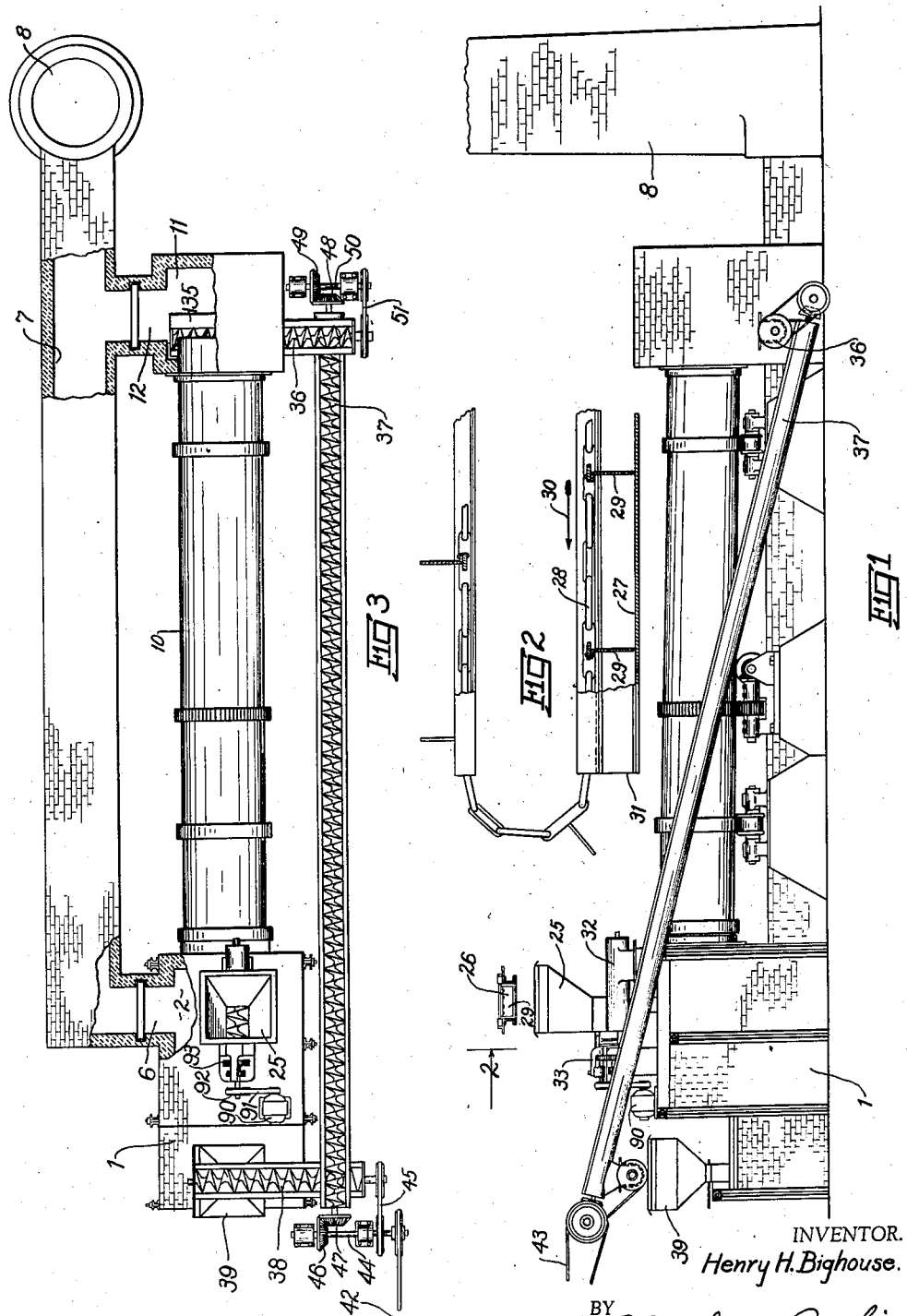

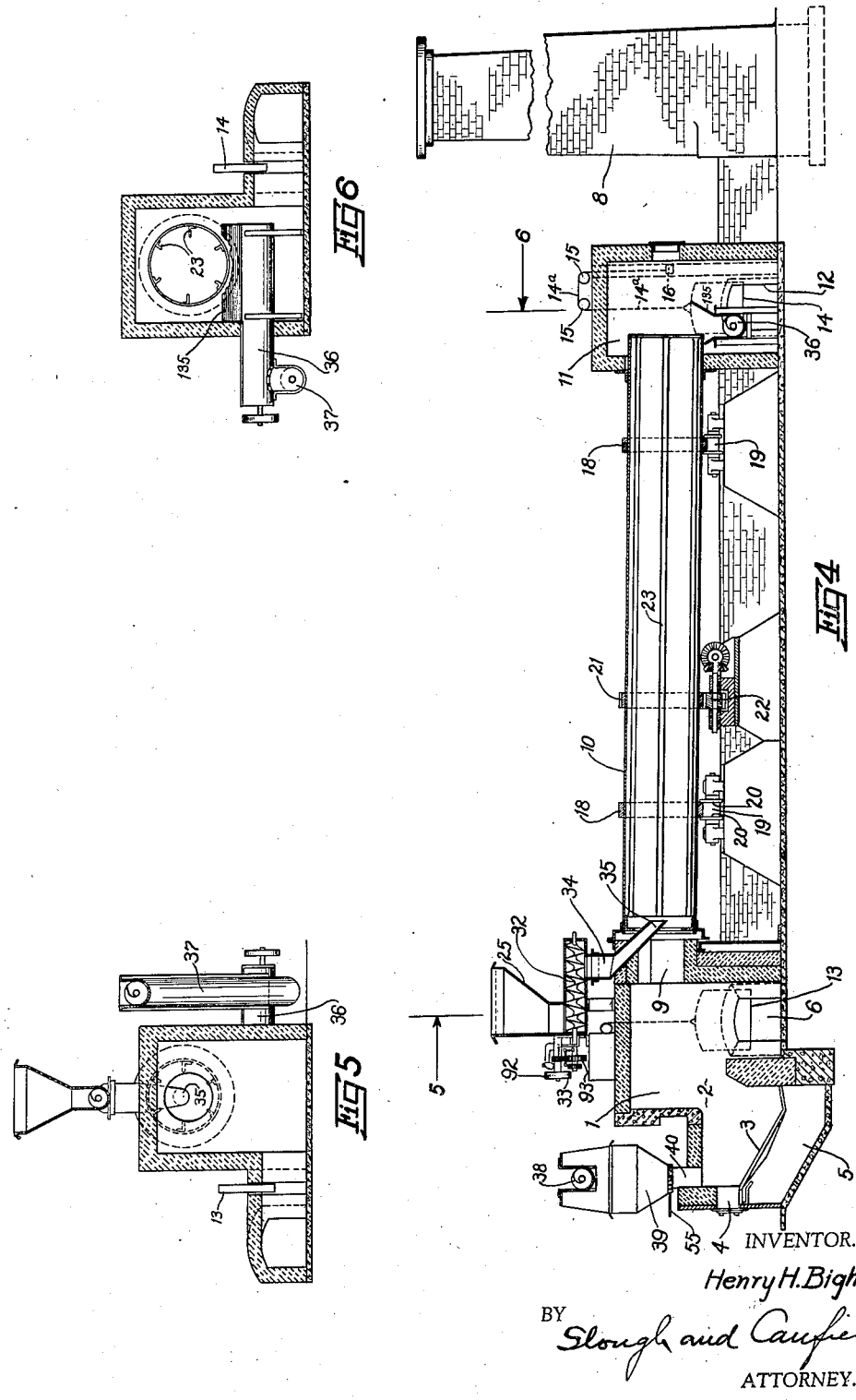

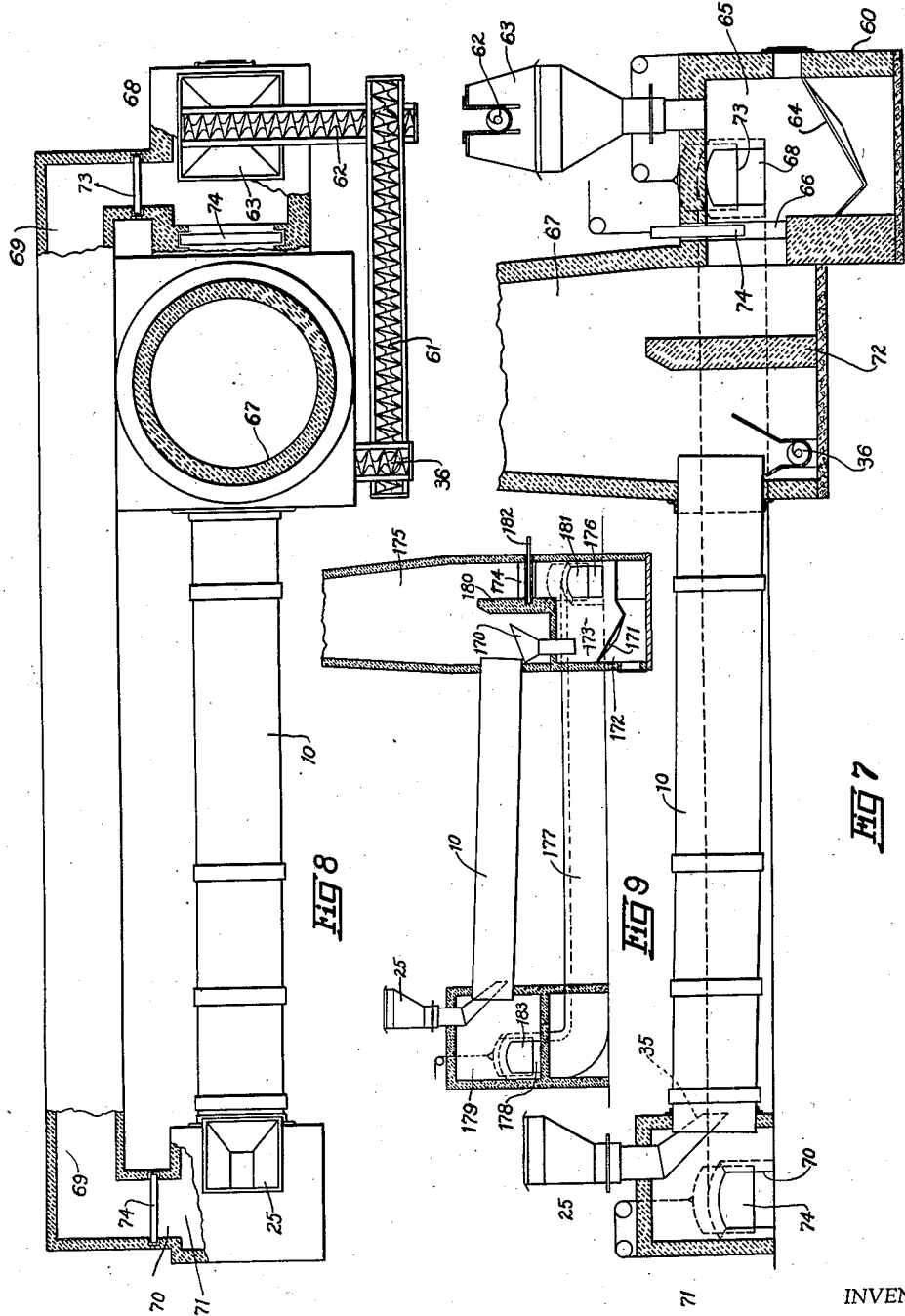

1,974,231

UNITED STATES PATENT OFFICE 1,974,231

METHOD AND MEANS OF INCINERATING GARBAGE

Henry H. Bighouse, Cleveland, Ohio, assignor to The C. O. Bartlett & Snow Company, Cleveland, Ohio, a corporation of Ohio Application June 24, 1932, Serial No. 619,044

8 Claims. (Cl. 110—15)

This invention relates to means and methods for incinerating garbage, refuse and the like.

It is the practice of municipalities, particularly large cities, to collect garbage and rubbish produced in and about households, hotels, restaurants, lunch rooms, clubs, hospitals, etc., and to transport the same to incinerating plants for the disposal thereof by combustion.

In some municipalities, garbage is collected separate from rubbish and in others there is combined collection. Garbage as ordinarily collected has a moisture content averaging from 70 to 75% by weight and consequently has very low calorific value. Rubbish, however, usually includes such material as discarded paper, pasteboard, rags, mattresses, furniture, clothing, carpets, packing boxes, leaves, grass cuttings, etc. Obviously, such rubbish has relatively high calorific value.

When a sufficient quantity of such rubbish is mixed with the garbage, the mixture can readily be destructively burned in an incinerating plant.

But in municipalities where rubbish collections are not made, or where the rubbish so collected is not sufficient to supply the necessary heat units or fuel necessasry to burn the garbage, coal or other supplemental fuel is required, thus making the incinerating operation expensive.

Sewage sludge is another class of refuse which contains so much moisture in proportion to the potential heat units therein that it has heretofore been generally found impossible to effect complete destructive combustion thereof without the use of supplemental fuel, such as coal, oil, gas, etc.

It will be generally understood that in burning refuse, if it be garbage or sewage sludge or the like, or a mixture thereof with rubbish, the high moisture content of the refuse must first be reduced to render it combustible; and in this connection it has generally been recognized in this art that materials such as garbage and sewage sludge having a moisture content of 70% and over by weight, cannot be self-consumed by the heat units contained therein; and that to destroy such refuse by incineration, the furnace must be fired with supplemental fuel, to supplement the heat units in the refuse.

Furthermore, even in incinerating plants in which refuse of high moisture content is to be consumed, with the aid of supplemental fuel, problems arise, not heretofore successfully solved, in connection with the successful operation of the plant involving the reduction of the moisture content in the refuse to be burned. Various attempts have been made heretofore to solve this problem, some of which involve first charging the refuse materials onto a drying hearth associated with the combustion furnace where the materials are subjected to the heat from the furnace for a period of time before being transferred to the grate bars of the furnace to be burned. O'her attempts to solve the problem, by reducing the moisture content of the refuse by a conditioning process prior to charging it into the furnace, have not met with success due to the liability of pre-drying the material to a point where it gives off objectionable odors which escape into the air in the neighborhood of the plant and are in the nature of a nuisance.

It is therefore an object of the present invention to provide an improved method and means for the destructive combustion of refuse such as garbage, sewage sludge or the like.

Another object of my invention is to provide a method and means for the destructive combustion of refuse such as garbage, sewage sludge or the like having a moisture content of the order of 70% or higher, by utilizing the heat units contained therein and without supplemental fuel.

Another object is to provide a method and means operating in an improved manner to employ the potential heat units of a quantity of refuse such as garbage or the like of high percentage moisture content, to first reduce the percentage of moisture of the refuse and then to consume it by combustion.

Another object is to provide a method and means operating in an improved manner to employ the potential heat units of a quantity of refuse such as garbage or the like of high percentage moisture content, to first reduce the percentage of moisture of the refuse and then to consume it by combustion and without supplemental fuel.

Another object is to provide a method and means for employing heat to reduce the moisture content of refuse to be burned, in a manner to prevent the concurrent emanation of odors from the refuse being heated.

Another object is to provide a method and means for pre-heating refuse to reduce the moisture content thereof and operating to gradually reduce the pre-heating temperature concurrently with the reduction of moisture content to prevent the pre-heating operation from driving off objectionable odors from the refuse.

Another object is to provide an improved method and means for the destructive combustion of refuse, sludge or the like, of high percentage moisture content.

Other objects of my invention will be apparent to those skilled in the art to which it appertains.

My invention is fully disclosed in the following description taken in connection with the accompanying drawings, in which:—

Fig. 1 is a side elevational view of an incinerating plant embodying my invention in one form;

Fig. 2 is a fragmentary view to an enlarged scale of a conveyor mechanism which I may employ, the view being taken approximately from the plane 2 of Fig. 1;

Fig. 3 is a top plan view, partly in section, of the embodiment of Fig. 1;

Fig. 4 is a longitudinal sectional view of the embodiment of Fig. 1;

Fig. 5 is a transverse sectional view taken approximately from the plane 5 of Fig. 4;

Fig. 6 is a transverse sectional view taken approximately from the plane 6 of Fig. 4;

Fig. 7 is a view generally similar to Fig. 4 illustrating in simplified form a second embodiment of my invention;

Fig. 8 is a top plan view, partly in section, of the embodiment of Fig. 7;

Fig. 9 is a view similar to Fig. 7 illustrating still another embodiment of my invention.

Referring to the drawings, particularly Figs. 1 to 6 inclusive, I have shown generally at 1 a furnace comprising a combustion chamber 2, grate bars 3, a stoking door 4 and an ash pit 5 under the grate bars.

The products of combustion of fuel on the grate bars 3, may flow through the combustion chamber 2 and under certain selective conditions of operation to be described, may flow either laterally out of the combustion chamber through a passageway 6, and thence through a relatively long duct 7 to a stack 8; or may flow out of the combustion chamber 2 through a passageway 9 into one end of the cylinder 10 of a dryer, through the cylinder 10 and out at the opposite end into a discharge chamber 11 and thence by a passageway 12 into the duct 7 and to the stack 8.

The relative proportion of the hot gaseous products of combustion which flow over these two conduit paths may be operatively controlled or regulated by vertically adjustably movable dampers or slides 13 and 14, the slide 13 being adapted to be raised or lowered to open or close to any desired extent the passageway 6, and the door or slide 14 similarly being operatively movable to close or open the passageway 12. By a cable 14a pulleys 15, and a counter-weight 16, the doors may be balanced so that they will remain in any elevated adjusted position.

The drying cylinder 10 may be of any suitable or well known construction such as one of the commercial types of dryer. In the form illustrated, the cylinder 10, preferably formed from sheet metal, has annular external supporting rings 18—18 resting upon rollers or wheels 19—19 having flanges 20 overlapping the axial ends of the rings 18. The cylinder 10 is thus rotatably supported on the rollers 19 and fixed against axial movement.

A ring gear 21 around the outside of the cylinder 10 meshes with a power-driven pinion 22 whereby the cylinder 10 may be rotated. The cylinder 10 is disposed with its axis slightly inclined, and interiorly, the inner wall of the cylinder has secured thereto a plurality of longitudinally extending ribs or lugs 23 (see Figs. 4 and 6).

In a well known manner, material charged into the higher or left-hand end (as viewed in the drawing) of the rotating cylinder 10 will be continuously agitated and will move toward the lower end and be discharged therefrom.

As hereinbefore referred to, garbage of high percentage moisture content is fed or conducted through the plant in a manner to completely consume the same by combustion. The course of the garbage through the plant and the apparatus for handling the same will now be described.

The garbage when delivered to the plant may be stored in a pit, deposited upon a floor, or otherwise temporarily stored, from which storage it is delivered upon a conveyor for conveying it to the combustion plant proper illustrated in the drawings. Or, the garbage or like refuse delivered at the plant may be transferred directly to the conveyor. The particular arrangement of the plant for receiving and handling the garbage which has been collected and delivered to the plant does not constitute an essential part of my invention.

In whatever manner the garbage is transferred to the supplying conveyor, it is delivered thereby and discharged into a hopper 25. A part of the conveyer for supplying the hopper 25 is illustrated in cross-section at 26 and is illustrated in simplified form to a slightly larger scale than in Fig. 1, in Fig. 2.

The particular form of conveyor illustrated comprises generally a channel 27, and an endless chain 28, upon which are provided scraping devices or vanes 29—29, the chain and channel being relatively disposed so that the devices 29 will sweep through the channel 27 and thus convey along longitudinally through the channel, material deposited therein. The chain 28 may be mounted upon sprockets or other means for maintaining the same in longitudinal movement; and thus when the chain moves in the direction of the arrow 30, material in the channel 27 will be discharged from an end such as 31 of the channel.

This form of conveyor is merely illustrative and other known or suitable types may be employed to convey the garbage from a suitable receiving point to the hopper 25 and discharge it thereinto.

A spiral screw conveyor 32 of any known or suitable construction is disposed directly under the hopper 25 and may be rotatively driven by any suitable driving means such as that illustrated generally at 33. The conveyor 32 discharges material fed thereto from the hopper 25 at a regular rate in a well known manner to a down spout 34, Fig. 4, having a forwardly inclined portion 35 projected into the upper end of the cylinder 10, so that garbage or like refuse material is fed by the conveyor 32 into the cylinder 10 at a uniform rate which may be predetermined or varied as desired by regulating the speed of the screw conveyor 32.

At this point it may be assumed that combustion is going on, on the grate bars 3 and in the combustion chamber 2, and that by a suitable setting of the slides 13 and 14 above described, some or all of the hot gaseous products of combustion flow downwardly through the cylinder 10 on the way to the stack 8. The garbage or the like in the cylinder 10 moves progressively longitudinally through the cylinder 10, being continuously churned or agitated therein and thus is brought into intimate contact with the hot gases and moisture is evaporated therefrom.

It will be observed that the hot gases entering the upper or left end (as viewed in the drawings) of the cylinder 10, come into contact with the garbage while in its wettest or most moist condition, and as the drying operation goes on, heat is absorbed from the gases by the evaporation of moisture, the heat disappearing as the well known latent heat of evaporation, so that by the time the partly dried garbage reaches the lower end of the cylinder 10, it is in contact with relatively cooler gases.

This is one of the important features of my invention. It is well known that garbage or like refuse may be heated without danger of driving off therefrom objectionable odors provided that the temperature is not raised to a carbonizing or scorching temperature; and particularly there is no danger of producing odors if the heating is carried on under such conditions that the garbage is at all times immersed in water vapor or a "vapor bath". These conditions conducive to the preventing of odor are ideally present in the arrangement just described. The garbage at the upper end of the cylinder 10 has such a high moisture content that the very hot gases cannot scorch the same, and at the lower end of the cylinder where the moisture content is reduced, the temperature of the gas is also reduced; so that when the garbage is discharged from the lower end of the cylinder 10, it is substantially without odor of the kind which, if discharged from the stack would be objectionable.

I have found that in the practice of my invention, it is suitable to reduce the moisture content of the garbage to approximately 30% by weight, and this may readily be effected in the apparatus described by adjusting the slides 13 and 14 to divert more or less of the hot gases through the cylinder 10 and/or by changing the rate of supply of garbage to the cylinder by changing the rate of speed of the conveyor 32.

I have found that garbage having a moisture content of 30% is not liable to be burnt and give off odors by contact with the hot gaseous products of combustion which have been cooled by evaporation of moisture from the garbage to reduce its content from greater percentage proportions; and I have also found that garbage having a moisture content of substantially 30%, may be completely consumed by combustion, employing only the heat units therein and without supplemental fuel.

For these reasons, as stated, I reduce the moisture content to approximately 30%; and as will now be described, I convey the garbage thus partly dried to the furnace supplying the drying heat and there consume it.

To this end, the garbage material in its partly dried condition discharged from the cylinder 10 drops into a hopper 135 below which is disposed a screw conveyor 36 disposed to convey the material laterally out of the chamber 11 through the wall thereof.

The conveyor 36 discharges the material upon an inclined screw type conveyor 37 which carries it back in the general direction of the furnace 1 and discharges it upon a screw conveyor 38 disposed so as to discharge the material into a hopper 39 having a downwardly open mouth 40 opening into the chamber 2 directly above the grate bars 3.

The combustion which was assumed to be going on upon the grate bars 3 and in the chamber 2 is now continuously maintained by the garbage material dropped upon the grate from the hopper 39, so that the process is continuous.

At 42 generally I have illustrated power means for driving the conveyors 38, 37 and 36 comprising a power-supplying belt 43 and a shaft 44 from which power is transmitted by a belt or chain 45 to the conveyor 38 and from which by means of bevel gears 46 and 47 power is transmitted to the conveyor 37. At the lower end of the conveyor 37, by means of bevel gears 48 and 49, a shaft 50 and a belt 51, the power is again transmitted to the conveyor 36. Although I have shown and described the screw type conveyor for the conveyors 36, 37, 38, it will be understood that this is not essential and that other types of conveyor may be employed, such for example as that illustrated in Fig. 2.

The hopper 39 may be variously constructed and may have capacity to contain a supply of the garbage material whereby it may be discharged into the furnace upon the grate bars 3 at intervals. To this end a sliding door 55 may be provided at the bottom of the hopper 39 to shut off the flow of material to the furnace, or to permit a quantity to flow thereinto.

The material discharged upon the grate bars 3 may be distributed thereover by suitable stoking tools inserted through the stoking door 4.

It is obvious that the grate bars 3 may be of the stoker type and that the material fed thereupon from the conveyors 36, 37 and 38 may be continuously stoked or fed whereby manual attention will be rendered unnecessary.

If desired, the hopper 39 may discharge upon or into stoking apparatus external of the furnace chamber 2 and fed thereinto by stoker mechanism of well known or suitable type. Inasmuch as stoking apparatus involving, for example, a hopper into which fuel to be stoked may be placed, is well known in this art, it is not considered necessary to illustrate or describe stoker apparatus into a hopper of which material from the hopper 39 could be discharged.

In starting up the plant above described, it may be necessary to start a fire upon the grate bars 3 with an initial charge of supplemental fuel, but as soon as some of the garbage material fed into the cylinder 10 from the spout 35 has made the complete circuit and is ultimately discharged upon the grate bars 3, additional supplemental fuel is unnecessary.

It will be observed that my invention is not limited to any exact proportions of moisture content of the material to be consumed. As will now be apparent, my invention provides a method and apparatus whereby garbage or like refuse containing a relatively great percentage of moisture, such a great percentage as to render it impossible of combustion by methods and apparatus known heretofore, may be fed into the apparatus and completely consumed by combustion of the heat units therein and without supplemental fuel. My invention is also not limited to the partial drying of the refuse down to any particular percentage of moisture in the cylinder 10, inasmuch as any final percentage thereof may be suitably attained by adjusting the apparatus as above described; the only essentials in this connection being to evaporate out moisture down to a point at which the resultant garbage material will support its own combustion on the grate bars and at which it will not give off objectionable odors to be discharged through the stack.

It is understood, of course, that the complete combustion of the material on the grate bars and in the chamber 2 or in the passageways beyond the chamber 2, destroys any odors which may emanate from the material during the process of combustion.

Thus the method and apparatus of my invention provides for the complete destructive combustion of garbage or like refuse containing high percentages of moisture such as 75% or the like, and which may be fed into the apparatus at one point such as at the hopper 25 and by the potential heat units therein and without supplemental fuel will be completely consumed and discharged out of the stack 8 or as an ash residue in the ash pit 5.

The particular arrangement of the apparatus of Figs. 1 to 6 inclusive is not essential. For example, in Figs. 7 and 8 I have shown another arrangement whereby the principles of my invention may be carried out. In this form, the wet material is fed into the hopper 25, and discharged through a spout 35 into the cylinder 10 and discharged from the cylinder 10 into the conveyor 36. The furnace shown generally at 60 is disposed generally adjacent the lower end of the cylinder 10, and the material on the conveyor 36 is discharged upon a screw conveyor 61 and thence discharged upon the screw conveyor 62 from which it is discharged into a hopper 63 from which it drops upon grate bars 64 and is consumed thereon and in the combustion chamber 65.

The hot products of combustion from the chamber 65 may flow directly through a passageway 66 to the stack 67; or may flow through a passageway 68 and by way of a duct 69 through a passageway 70 into a chamber 71 and thence downwardly through the cylinder 10 and out of the lower end of the cylinder into the stack 67. A bridge wall 72 may be provided to prevent the hot gases from the furnace 60 from coming in direct contact with the material being discharged from the lower end of the cylinder 10.

The proportion of gases which are diverted through the cylinder 10 may be determined by adjusting the sizes of the passageways 66, 68, and 70 by means of sliding doors 73, 74, and 75, respectively.

In this form, a shorter and therefore less expensive conveyor system, 36—61—62 may suffice. The means for operating the conveyors 36, 61 and 62 is not shown in view of the more complete disclosure of the other form.

In Fig. 9 is illustrated in simplified form, which will be understood in view of the more complete showing of the other figures, a still further simplified form in which no conveyors are employed. In this form, the material fed into the hopper 25 and thence into the cylinder 10, is discharged at the lower end of the cylinder directly into a hopper 170 disposed directly above the grate bar 171 of a furnace 172 having a combustion chamber 173. The hot gases of combustion from the chamber 173 may flow directly upwardly through a passageway 174 into the stack 175; or may flow through a passageway 176 and a duct 177 and passageway 178 into a chamber 179, thence flowing through the cylinder 10 and at the lower end of the cylinder discharging into the stack 175.

A bridge wall or baffle 180 may be employed to prevent the hot gases which flow through the passageway 174 from coming in contact with the material discharged out of the cylinder 10 to avoid the possibility of burning the same.

Sliding doors 181, 182 and 183 may control the relative proportions of the hot gases which flow either directly to the stack or through the cylinder 10 to regulate the drying of the material in the cylinder.

In either of the embodiments of my invention illustrated and described hereinbefore, in order that combustion may be properly and continuously maintained in the furnace, it may be desirable to regulate the rate at which combustible refuse is fed thereto. If the material is fed too slowly, the fire may become too thin, or if fed too rapidly it may choke the fire in a well known manner. To this end, the rate at which the garbage is fed into the cylinder 10 out of the hopper 25 may be regulated as above referred to. One means of effecting this regulation is to drive the screw conveyor 32 by means of a variable adjustable speed motor 90 through a belt 91 and a pulley 92 and transmission speed reducing gears, ratchets or the like, 93.

Upon changing the speed of the conveyor 32, to regulate the rate of supplying fuel to the furnace, the amount of heat supplied interiorly to the cylinder 10 may be too great or too small for the purposes hereinbefore set forth, and it therefore may accordingly be varied by adjusting the damper doors or slides above described.

Again, independently of the rate of supplying garbage by the conveyor 32, the quantity of heat diverted into the cylinder 10 may be controlled and regulated in respect to the moisture content of the garbage to reduce the moisture thereof to a suitable self-consuming proportional content.

As stated hereinbefore, the gaseous products of combustion leave the cylinder at a reduced temperature. Such reduced temperature may be of the order of 600° F., whereas the temperature of the hot gases leaving the furnace and entering the cylinder may be of the order of 2000°. Likewise, the gases going from the furnace directly to the stack as described in connection with each of the several modifications above, may be of the order of 2000°. Thus, the low temperature moisture-laden gas leaving the cylinder mixes immediately, adjacent the end of the cylinder, with high temperature gases.

If now a change in moisture content of the garbage being supplied to the cylinder by the conveyor 32 should occur, or if an adjustment of the speed of the conveyor 32 should be necessary for the purposes described, or if the dried garbage being fed to the furnace should become of increased heat unit content, the desired balance of temperature and moisture content in the cylinder to prevent odor might thereby be disturbed, that is, either the gases might be too hot or the garbage too dry, so that some odor would be produced. Thereupon, the adjustment above described including the variation of the proportion of the gases going to the cylinder could be manipulated to restore the desired balance but in the meantime odors might be discharged into the atmosphere. However, any odor-producing material discharged with the low temperature gases from the cylinder at once mixes with the high temperature gas going directly from the furnace to the stack and at least some if not all of the odor-producing material will thereby be consumed and the odor destroyed before reaching the atmosphere.

This will be particularly true in cases wherein the garbage is not excessively moist to start with and therefore a considerable amount of the gases is diverted directly to the stack.

Thus the branch passageways in each of the modifications shown and described for conducting hot gaseous products of combustion directly toward the stack to mix on the way with moisture laden gases at the discharge end of the cylinder, aid in accomplishing odorless destruction of the garbage.

Thus my invention in the embodiments thereof, contemplates not only a method and apparatus for effecting the destructive combustion without supplemental fuel of high moisture content garbage, but contemplates also the adjustable adaptation of the embodiments or apparatus to variations of the moisture content, and to variations of combustibility of the garbage upon the grate bars of the furnace.

My invention is not limited to the exact details of construction shown and described inasmuch as many changes and modifications other than those set forth herein may be made without departing from the scope and spirit of my invention.

I claim:

1. In an apparatus for destructively burning refuse of high moisture content, a combustion furnace comprising a combustion chamber, a stack or the like, a walled passageway communicating with the combustion chamber and with the stack for conducting part of the hot gaseous products of combustion therethrough from the furnace to the stack, means for continuously introducing a supply of refuse into the passageway at one portion, means for causing it to move along the passageway in moisture extracting contact relation with the gaseous products of combustion flowing therethrough, means for conducting refuse from another portion of the passageway to the furnace to be consumed therein, a second walled passageway communicating with the combustion chamber, and communicating with the first named passageway at a portion between the stack and that portion of the first passageway at which refuse is conducted therefrom, to conduct hot gaseous products of combustion from the chamber to mix the same while at relatively high temperature with the relatively low temperature moisture laden gaseous products of combustion on the way to the stack.

2. An apparatus for destructively burning refuse of high moisture content as described in claim 1 and in which the refuse is caused to move through the passageway in the direction of movement of the products of combustion therethrough.

3. In an apparatus for destructively burning refuse of high moisture content, a combustion furnace comprising a combustion chamber, a stack or the like, a walled passageway communicating with the chamber and with the stack for conducting a first part of the hot gaseous products of combustion therethrough from the chamber to the stack, means for continuously introducing a supply of refuse into the passageway, means for causing it to move therethrough in moisture extracting relation to the hot gaseous products of combustion therein and means for conducting the refuse from the passageway to the furnace to be consumed therein, a second passageway communicating with the chamber and with the stack for conducting the remainder of the hot gaseous products of combustion from the chamber and disposed to mix the same while at relatively high temperature with the relatively low temperature moisture-laden first part of the gaseous products of combustion, and flow adjusting means associated with the two passageways to adjustably vary the relative amounts of gaseous products of combustion flowing therethrough.

4. The method of destructively burning refuse of high moisture content which includes confinedly burning continuously supplied partly dried refuse, confinedly conducting a flow of continuously supplied undried refuse, confinedly conducting a flow of some of the hot gaseous products of combustion from the burning refuse in moisture extracting relation with the flow of undried refuse, continuing confined flow of the now moisture-laden and relatively low temperature gaseous products of combustion away from the refuse leaving the latter partly dried, and discharging the moisture-laden products of combustion into the atmosphere, concurrently confinedly conducting a flow of the remainder of the hot gaseous products of combustion from the burning refuse and confinedly mixing the same while at relatively high temperature with the moisture-laden relatively low temperature gaseous products of combustion before its discharge into the atmosphere, and continuously adding the refuse partly dried by said moisture extraction to the refuse being confinedly burned.

5. In an apparatus for destructively burning refuse of high moisture content, a combustion furnace comprising a combustion chamber, a stack or the like, a walled passageway communicating with the combustion chamber and with the stack for conducting a part of the hot gaseous products of combustion therethrough from the combustion chamber to the stack, means for continuously introducing a supply of refuse into the passageway at one portion, means for causing it to move along the passageway in moisture-extracting contact relation with the gaseous products of combustion flowing therethrough, means for conducting refuse from another portion of the passageway to the furnace to be consumed therein, a second walled passageway communicating with the combustion chamber and disposed to conduct the remainder of the hot gaseous products of combustion from the chamber and mix them while at relatively high temperature with the relatively low temperature moisture-laden gaseous products of combustion.

6. In an apparatus for destructively burning refuse of high moisture content, a combustion furnace comprising a combustion chamber, a stack or the like, a walled passageway communicating with the combustion chamber and with the stack for conducting a first part of the hot gaseous products of combustion therethrough from the chamber to the stack, means for continuously introducing a supply of refuse into the passageway, means for causing it to move therethrough in moisture-extracting contact relation to the hot gaseous products of combustion therein, means for conducting the refuse from the passageway to the furnace to be consumed therein, a second passageway communicating with the chamber and with the stack for conducting the remainder of the hot gaseous products of combustion from the chamber and disposed to mix the same while at relatively high temperature with the relatively low temperature moisture-laden first part of the gaseous products of combustion, and flow-control means associated with the two passageways to control the relative amounts of gaseous products of combustion flowing therethrough.

7. An apparatus as described in claim 3 and in which the refuse is caused to move through the passageway in the direction of movement of the products of combustion therethrough.

8. An apparatus as described in claim 6 and in which the refuse is caused to move through the passageway in the direction of movement of the products of combustion therethrough.

HENRY H. BIGHOUSE.